United States Patent Office 2,928,086
Patented Mar. 8, 1960

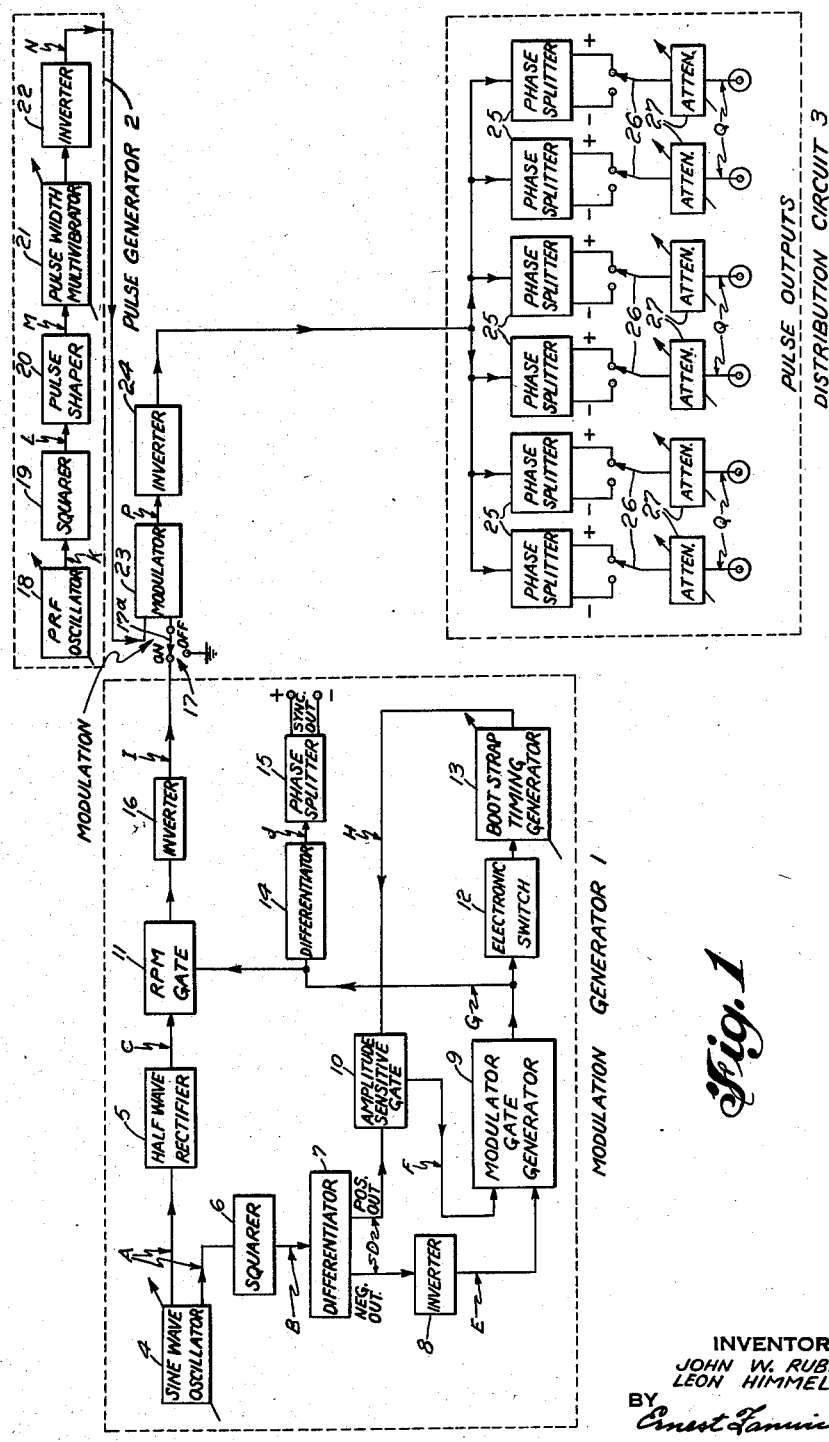

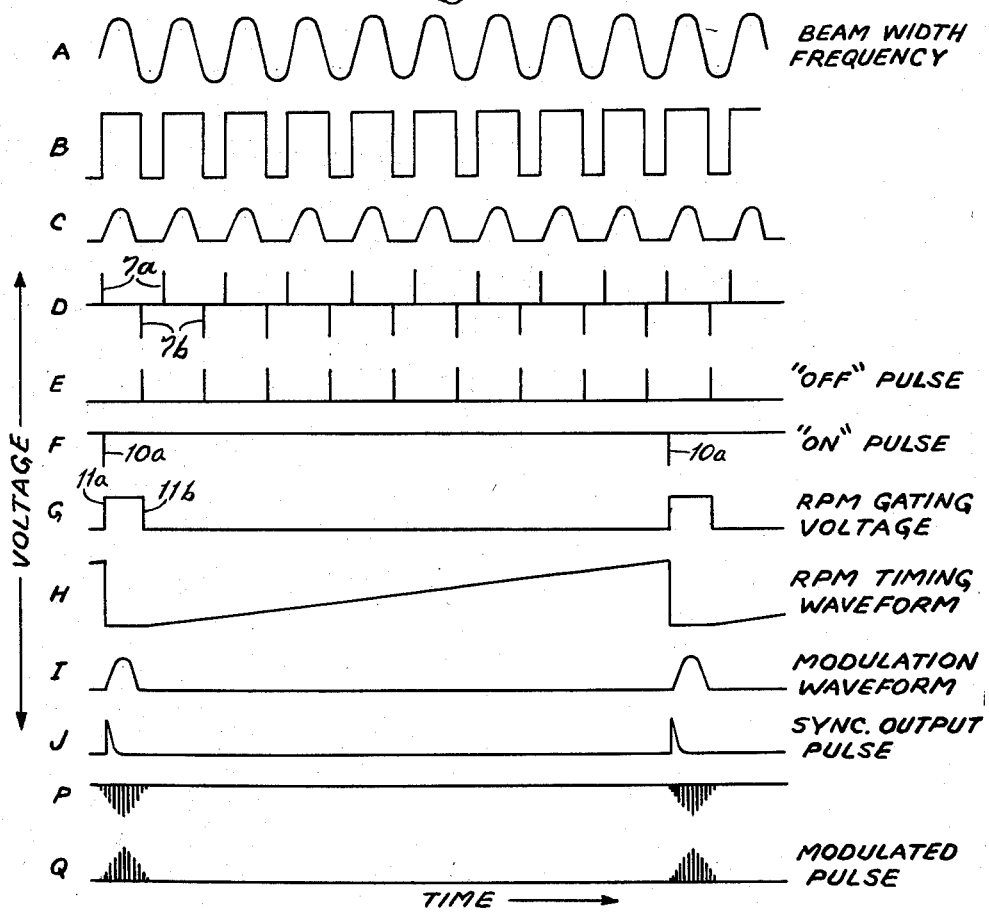

2,928,086

RADAR SIGNAL SIMULATOR

John W. Rubino, Fort Lee, and Leon Himmel, Cedar Grove, N.J., assignors to International Telephone and Telegraph Corporation, Nutley, N.J., a corporation of Maryland Application February 15, 1954, Serial No. 410,365

8 Claims. (Cl. 343—17.7)

This invention relates to modulated pulse generators and more particularly to test equipment which is capable of simulating the characteristics of many types of received radar signals.

It is well-known that in recent years much engineering effort has been directed to the design and development of receivers capable of detecting radar signals. Such receivers are extremely useful as counter-measure devices, that is devices capable of giving warning when the radiations of radar transmitters are detected. Although great expenditures of time and money have been put into the development of radar warning receivers little effort was directed to the testing of such equipment. There has been felt a great need for a signal source whose output simulates the signal which would be detected by a radar warning receiver under conditions of actual radar signal reception. In order to be most useful such a signal source must be capable of simulating the detected signal characteristics of many different types of radar systems. In effect, in the needed signal source it must be possible to vary the pulse repetition rate. It must be possible to simulate a radar transmitter utilizing a rotating antenna and thus be possible to simulate the revolutions per minute of antenna rotation and beam width or it must provide means to simulate a radar which is "tracked on" to a target and thus required no amplitude modulation or simulated antenna rotation. The pulse source of the desired test equipment besides having a repetition rate which is controllable must have a pulse width which is variable and the output of the test equipment must be of proper magnitude and sign to cooperate with other test equipment.

One of the objects of this invention, therefore, is to provide a source of simulated radar signals whose output signal characteristics can be varied to duplicate the received signal due to any one of many types of radar systems.

Another object of this invention is to provide an amplitude modulated pulse generator test equipment in which the repetition rate of the amplitude modulation signal and the pulse repetition rate, as well as the pulse width and the modulation signal width, can be varied within a wide limit.

A further object of this invention is to provide a test pulse generator whose output provides modulated pulses simulating the envelope waveform of the detected signal transmitted by a typical rotating beam radar system and the test generators having provision for adjustment of both beam width and simulated radar rotational rate as well as being capable of an unmodulated pulse output wherein either the modulated or unmodulated pulses have controllable pulse repetition rates, pulse width and pulse amplitude.

A feature of this invention is the provision of a modulation signal generator whose output closely resembles the envelope waveform of the detected signal transmitted by a typical rotating beam radar system. The output of the modulation generator can be controlled in width or rate, simulating a variation in a transmitted radar signal beam width or the rotational rate of a transmitting antenna. The output of the modulation signal generator modulates the output of a pulse generator whose pulse repetition frequency and width can be controlled within limits. If desired, the modulation can be eliminated to allow the radar signal simulator to duplicate a "tracked on" radar signal. The output of the pulse generator is fed to a distribution circuit where the output energy modulated or not is attenuated to provide an output level consistent with predetermined needs.

The above-mentioned and other features and objects of this invention will become more apparent by reference to the following description taken in conjunction with the accompanying drawings, in which:

Fig. 1 is a schematic diagram in block form of one embodiment of a radar signal simulator in accordance with the principles of this invention; and Fig. 2 is a graphic illustration of a series of curves plotting voltage versus time showing waveforms present in various portions of the block diagram shown in Fig. 1.

Fig. 3 is a graphic illustration of a series of curves plotting voltage versus time showing waveforms present in various portions of the block diagram shown in Fig. 1 but having a larger time scale than the waveforms of Fig. 2.

Fig. 4 is a graphic illustration of a series of curves plotting voltage versus time showing waveforms present in various portions of the block diagram shown in Fig. 1 but having a larger time scale than the waveform of Fig. 3.

Referring to Fig. 1, a schematic diagram in block form of one embodiment of the radar signal simulator of this invention is shown wherein the waveforms illustrated in Figs. 2–4 present in various points of the block diagram of Fig. 1 are indicated by corresponding letters to indicate the points where the waveforms of Figs. 2–4 are found. A modulation generator 1 generates a modulating waveform which is coupled to a modulator 23 by means of a switch 17 to modulate a pulse output from a pulse generator 2. The modulated pulse output is coupled to a distribution circuit 3 making available at the output taps of the distribution circuit signals which closely simulate energy detected by a receiver located in the energy transmission path of the antenna of a radar system. Referring to the modulation generator 1, a sine wave oscillator 4 generates a sinusoidal output A which is applied to a half wave rectifier 5 and a squaring circuit 6. The frequency of the output of sine wave oscillator 4 may be varied within wide limits. The energy coupled to the squaring circuit 6 is converted into a square waveform shown in curve B and coupled to a differentiator circuit 7 whose output shown in curve D comprises a series of positive pulses 7a coincident in time with the leading edge of the square wave of curve B and a series of negative pulses 7b coincident in time with the trailing edge of the square wave of curve B. The negative pulsed output 7b of differentiator circuit 7 is transformed into a series of positive pulses shown in curve E through the use of the inverter circuit 8 whose output waveform E is coupled to a modulator gate generator 9. The positive pulsed output 7a of differentiator circuit 7 is coupled to an amplitude sensitive gate 10 whose output shown in curve F is responsive to the output H of the adjustable bootstrap timing generator 13. The output of amplitude sensitive gate 10 is coupled to the modulator gate generator 9. Each time a negative pulse 10a is coupled from the amplitude sensitive gate 10 to the modulator gate generator 9, it turns on generator 9 causing a gating voltage shown in curve G, to be coupled to a revolution per minute (r.p.m.) gate 11. The gating voltage output G from the modulator gate generator 9 is shut off when the positive pulse of curve E is coupled from the inverter 8 to the modulator gate generator 9. Thus, it is apparent that the gating voltage shown in curve G coupled to the r.p.m. gate 11 from the modulator gate generator 9 comprises substantially a square wave having its leading edge 11a coincident in time with the negative "on" pulse 10a, curve F, from the amplitude sensitive gate 10, and its trailing edge 11b coincident in time with the next positive "off" pulse, curve E from inverter 8.

The output G of the modulator gate generator 9 closes electronic switch 12 sending a signal to the bootstrap timing generator 13. The waveform shown in curve H is generated by the bootstrap timing generator 13. When a certain voltage level of curve H is reached the output of the bootstrap timing generator 13 opens the amplitude sensitive gate 10 causing the pulses of curve F to be coupled to the modulator gate generator 9. The output G of the modulator gate generator may also be coupled to differentiator 14 whose output comprises a plurality of synchronous pulses shown in curve J in synchronism with the r.p.m. gating voltage G. The output J of differentiator 14 is coupled to a phase splitter 15 to provide output pulses of a positive or negative polarity in synchronism with the modulation waveform. The r.p.m. gate 11, controlled by the output G of the modulator gate generator 9, opens to permit a portion of the output C of a half wave rectifier 5 to be passed to an inverter 16 whose output I comprises the modulation waveform which is coupled to the input switch 17 of the pulse generator 2.

Switch 17 allows the output of pulse generator 2 to be either modulated or unmodulated depending upon the position of the switch armature 17a. For purposes of explanation, assume that it is desired to have an amplitude modulated pulse output from the pulse generator 2. A pulse oscillator 18 is provided whose pulse repetition frequency may be varied within wide limits to a desired rate. The output shown in curve K, of oscillator 18 is coupled to a squaring circuit 19 whose output shown in curve L is shaped in pulse shaper circuit 20. The output waveform M of shaper circuit 20 is coupled to the input of multivibrator 21 whose output comprises a series of pulses similar to the input pulses M but having a width or duration that can be varied. The output of the pulse width multivibrator 21 is inverted in circuit 22 whose output N is coupled to modulator 23 along with the modulation waveform for modulation generator 1. The pulse modulated output P of modulator 23 is inverted in circuit 24 and coupled to the input of the distribution circuit 3. The modulated pulse output of pulse generator 2 is coupled to a plurality of phase splitters 25 in the pulse distribution circuit 3. The output of the phase splitters 25 can be either positive or negative as selected by switches 26. The output of the switches 26 are coupled to an attenuator 27 in each of the output channels, thus individual control of the output amplitude is afforded.

Referring to Fig. 2, it is seen that the output waveform shown in curve Q has a shape substantially equal to the shape of an envelope wave detected by a receiver that is in the field of transmission of a rotating antenna of a radar system. Obviously, if the simulated radar system has a greater or lesser rotational rate for its antenna the modulated pulse output of curve Q can increase or decrease its repetition rate by merely increasing or decreasing the timing of the adjustable bootstrap timing generator 13 which, in turn, would control the increase or decrease in the opening and closing of the r.p.m. gate. Since the control signal for the r.p.m. gate 11 is responsive to signal derived from the sine wave oscillator 4, it is obvious that the beam width of the output of oscillator 4 will be coordinated with the repetition rate due to the opening of gate 11 and the greater the repetition rate the less the beam width due to the output of oscillator 4.

It is also obvious that if the radar system to be simulated has an increased pulse repetition rate this can be obtained in the test equipment of this invention by varying the pulse repetition frequency of oscillator 18. To simulate a variation in the duration or width of the pulses emitted by the radar system to be simulated, it is only necessary to adjust the multivibrator 21 whose output pulses N can have a greater or lesser duration. Some radar systems after searching out a target will lock on and continue to track the target. The signals detected by a receiver located at a tracked on target will not be amplitude modulated because the antenna is no longer rotating but is focused upon the detected object. To simulate such a locked on radar transmitter it is necessary to eliminate the amplitude modulation of the pulse output of generator 2. This is accomplished in the equipment of this invention by moving the armature 17a of switch 17 from the on position to the off position. The reception of radar signals decreases in amplitude proportional to the distance between the receiver and the transmitter. To simulate transmitters at varying distances attenuators 27 are provided in distribution circuit 3. The greater the attenuation introduced by circuits 27, the greater the simulated distance between the radar system and receiver under test.

While we have described above the principles of our invention in connection with specific apparatus, it is to be clearly understood that this description is made only by way of example and not as a limitation to the scope of our invention as set forth in the objects thereof and in the accompanying claims.

We claim:

1. A modulation signal generator comprising a source of sine wave signals, means to vary the frequency of said sine wave signals, means to rectify said sine wave signals, means to generate a control signal responsive to said sine wave signals, means to vary the repetition rate of said control signal, and gating means responsive to said control signal and coupled to the output of said rectifier means to pass certain of said rectified sine wave signals.

2. A modulation signal generator according to claim 1 which further includes means responsive to said control signal coupled to said means to generate said control signal to generate a synchronizing pulse each time said gating means passes one of said rectified signals.

3. A radar signal simulator to produce a modulation signal having a waveform substantially equal to the shape of the envelope wave detected at a receiver due to the transmission radiated by a rotating antenna of a radar transmitter comprising a modulation generator to produce the envelope characteristic of a signal radiated by a rotating radar antenna, said modulation generator including a source of sine wave signals, means to vary the frequency of said sine wave signals, means to rectify said sine wave signals, means to generate a control signal responsive to said sine wave signals, gating means responsive to said control signal and coupled to the output of said rectifying means to pass certain of said rectified sine wave signals as the output of said modulation generator, pulse generator means to generate a plurality of pulses, and modulation means to amplitude modulate said pulses with said output of said modulation generator.

4. A radar signal simulator according to claim 3 having further means to vary the repetition rate of said control signal.

5. A radar signal simulator to produce a modulation signal having a waveform substantially equal to the shape of the envelope wave detected at a receiver due to the transmission radiated by a rotating antenna of a radar transmitter comprising a modulation generator to produce the envelope characteristic of a signal radiated by a rotating radar antenna, said modulation generator including a source of sine wave signals, means to vary the frequency of said sine wave signals, means to rectify said sine wave signals, means to generate a control signal responsive to said sine wave signals, gating means responsive to said control signal and coupled to the output of said rectifying means to pass certain of said rectified sine wave signals as the output of said modulation generator, pulse generator means to generate a plurality of pulses including means to vary the frequency of said pulse generator and means to vary the width of pulses from said pulse generator, and modulation means to amplitude modulate said pulses with said output of said modulation generator.

6. A modulation signal generator comprising a source of sine wave signals, means to rectify said sine wave signals coupled to said source, means to generate a control signal responsive to said sine wave signals including a squarer coupled to the output of said source, a first differentiator, means coupling said first differentiator to said squarer, a first inverter, an amplitude sensitive gate, means coupling the negative output of said first differentiator to said first inverter, means coupling the positive output of said differentiator to said amplitude sensitive gate, a modulator gate generator, means coupling the outputs of said first inverter and said amplitude sensitive gate to said modulator gate generator, a boot strap timing generator, an electronic switch coupling the output of said modulator gate generator to said boot strap timing generator, means coupling the output of said boot strap timing generator to said amplitude sensitive gate; a revolution per minute gate coupled to the output of said rectifying means, means coupling the output of said modulator gate generator to said revolution per minute gate to pass certain of said rectified sine wave signals responsive to the output of said modulator gate generator, a second inverter, means coupling the output of said revolution per minute gate to said second inverter to obtain as the output of said second inverter a modulation waveform, and synchronizing means responsive to said control signal including a second differentiator, means coupling the output of said modulator gate generator to said second differentiator, and a phase splitter coupled to the output of said second differentiator whereby a synchronizing pulse is obtained as the output of said phase splitter each time there is an output of said rectified signal from said revolution per minute gate.

7. A modulator signal generator according to claim 6 wherein said bootstrap timing generator includes means to vary the repetition rate of said control signal.

8. A modulation signal generator comprising a source of sine wave signals, means to rectify said sine wave signals coupled to said source, means to generate a control signal responsive to said sine wave signals including a squarer coupled to the output of said source, a first differentiator, means coupling said first differentiator to said squarer, a first inverter, an amplitude sensitive gate, means coupling the negative output of said first differentiator to said first inverter, means coupling the positive output of said differentiator to said amplitude sensitive gate, a modulator gate generator, means coupling the outputs of said first inverter and said amplitude sensitive gate to said modulator gate generator, a boot strap timing generator, an electronic switch coupling the output of said modulator gate generator to said boot strap timing generator, means coupling the output of said boot strap timing generator to said amplitude sensitive gate; a revolution per minute gate coupled to the output of said rectifying means, means coupling the output of said modulator gate generator to said revolution per minute gate to pass certain of said rectified sine wave signals responsive to the output of said modulator gate generator, a second inverter, means coupling the output of said revolution per minute gate to said second inverter to obtain as the output of said second inverter a modulation waveform, synchronizing means responsive to said control signal including a second differentiator, means coupling the output of said modulator gate generator to said second differentiator, a phase splitter coupled to the output of said second differentiator whereby a synchronizing pulse is obtained as the output of said phase splitter each time there is an output of said rectified signal from said revolution per minute gate, pulse generator means including a pulse oscillator, means to vary the pulse repetition frequency of said oscillator, a pulse shaper, a second squarer coupling said pulse oscillator to said pulse shaper, a pulse width multivibrator, means coupling the output of said pulse shaper to said pulse width multivibrator, a third inverter, a modulator, means coupling the output of said third inverter to said modulator, switching means coupling the modulation waveform output of said second inverter to said modulator, a fourth inverter, means coupling the output of said modulator to said fourth inverter whereby an output is obtained from said inverter of a modulated pulse having the envelope of the modulation waveform output of said second inverter.

References Cited in the file of this patent

UNITED STATES PATENTS

| | | |
|---|---|---|
| 2,510,299 | Schramm | June 6, 1950 |
| 2,555,442 | Hales | June 5, 1951 |
| 2,560,587 | Miller | July 17, 1951 |
| 2,698,432 | Blasingame | Dec. 28, 1954 |
| 2,776,427 | Bedford | Jan. 1, 1957 |